United States Patent Office 2,852,473
Patented Sept. 16, 1958

2,852,473

METHOD OF PREPARING ALUMINA AND HYDROFORMING CATALYST THEREON

Charles E. Welling, Dearborn, Mich., assignor to W. R. Grace & Co., New York, N. Y., a corporation of Connecticut No Drawing. Application June 8, 1955
Serial No. 514,125

9 Claims. (Cl. 252—451)

This invention relates to the preparation of a hard, porous alumina suitable as a catalyst support. It also relates to the preparation of a molybdena-alumina and a molybdena-alumina-silica reforming catalyst.

The alumina hydrate of commerce, crystalline alumina trihydrate, is prepared by crystallization from a solution of sodium aluminate in accordance with the well known Bayer process. This process results in the formation of alumina crystals which settle rapidly and from which a large portion of the supernatant liquid may be decanted. The Bayer alumina is also susceptible of vigorous washing without undue clogging of the filter. However, partly because of its impurity, this alumina is not considered a particularly good gasoline reforming catalyst base. For the most part, alumina reforming or hydroforming catalyst bases are prepared by the action of a basic precipitant upon an aluminum salt solution, the reaction between aluminum and water containing a peptizing agent and gelation of the resulting sol, or by the hydrolysis of aluminum acetate or formate or of aluminum alcoholates. The resulting aluminas are gelatinous and have high surface areas. In the preparation of these gelatinous aluminas, however, the precipitating alumina does not readily settle, and the product is separated from its aqueous reaction medium only with the greatest difficulty. Because they are light and have a gelatinous structure, these aluminas are exceedingly hard to satisfactorily filter.

The present invention provides a method of preparing an alumina which has the settling characteristics of Bayer alumina, without having the undesirable filtering characteristics of aluminas prepared by precipitation or gelation. The alumina prepared in accordance with the present invention is hard, porous, has a high surface area, and is easily sized. In these respects it is like the gelatinous aluminas, while at the same time, it settles very readily and a large portion of the supernatant reaction liquid can be decanted from it. It is also very easily filtered. In addition to the many process advantages of the present invention, the resulting hard alumina is an excellent catalyst support.

In accordance with the method of the present invention, aluminum is first amalgamated, preferably with a solution of a mercuric salt such as mercuric chloride. The amalgamated aluminum is contacted with a dilute aqueous solution of hydrogen peroxide and the reaction mixture thoroughly agitated. Reaction between aluminum and hydrogen peroxide solution to form alumina is allowed to continue until the aluminum is consumed, or until no more aluminum reacts. Agitation is then suspended, and the mixture may be allowed to stand for a period of time during which the newly formed alumina settles. A major portion of the supernatant liquid may then be decanted, and the remaining liquid removed by filtration. Alternately, at the end of the reaction the mixture may be charged to a filter, without settling and decantation, and the alumina recovered as a wet filter cake. The alumina may then be washed and refiltered.

The resulting hard filter cake is then dried above about 230° F. to form a very hard, porcelain-like, yet porous alumina, which is easily broken and sized. The product is predominantly alpha alumina monohydrate.

The degree of hardness of the alumina product is a function of the concentration of hydrogen peroxide in the treating solution. The most desirable product from the standpoint of hardness, porosity, and surface area is prepared with hydrogen peroxide solutions containing between about 1% and 4% by weight $H_2O_2$. As the hydrogen peroxide concentration in the solution is increased above 4%, the hardness of the alumina decreases rather sharply. In most instances, the hydrogen peroxide solution concentration is desirably about 3% by weight $H_2O_2$.

The hardness of the alumina product is also related to the weight ratio of amalgamated aluminum to hydrogen peroxide solution of any given $H_2O_2$ concentration. For a hydrogen peroxide solution of concentration within the above limits, a hard, porous, alumina can be prepared when the initial weight ratio of aluminum to hydrogen peroxide solution is as low as 1:100 and as high as 1:25. Employing a solution containing about 3% by weight $H_2O_2$, the weight ratio of aluminum to hydrogen peroxide solution is desirably between 1:60 and 1:80.

The hardness of the alumina product is also related to the temperature at which the reaction is carried out. With respect to hardness, porosity and surface area, a desirable product is obtained when the temperature of the reaction medium is between about 70° C. and the boiling point. Since the reaction under consideration is exothermic, external heat is usually only required when employing hydrogen peroxide solutions of a concentration near the lower end of the specified range at a high weight ratio of aluminum to hydrogen peroxide solution. In most instances the reaction temperature will remain spontaneously between about 80° and 90° C. However, occasionally it is necessary to employ external cooling to prevent boiling.

While the description of the present invention has thus far been restricted to preparing a hard alumina filter cake which is subsequently dried to a porcelain-like alumina susceptible of crushing and sizing, the invention is not limited to the preparation of alumina in this form. For example, following separation of the alumina from the reaction mixture, the material may be slurry washed if desired, and the final slurry spray-dried to form microspheroidal particles of alumina. The alumina prepared by this invention may also be shaped, as by extrusion. In the latter case the alumina is mixed with water to form a thick paste which is easily extruded. No binder is required, and following calcination the resulting extrusions are exceedingly hard and possess other desirable physical properties.

The present invention also provides a method of preparing a gasoline reforming or hydroforming catalyst, particularly a molybdena hydroforming catalyst, on the alumina base prepared as above described. The catalyst comprises a small portion of molybdena, usually up to about 15% by weight of the catalyst, on the alumina support. If desired, this catalyst may be promoted with a small quantity, usually less than 3%, of silica. The small quantity of silica reduces the activity of the catalyst slightly, but greatly increases its thermal stability. Since the activity of the molybdena-alumina catalyst prepared by the present invention is substantial, the incorporation of the small amount of silica is not considered detrimental in view of the improvement in stability.

In accordance with this aspect of the present invention, the alumina prepared as above described is impregnated with a thermally decompossable molybdenum salt and, if desired, with a silicon compound easily converted to silica.

The alumina, following removal from the aluminum-hydrogen peroxide reaction mixture, may be slurried with water and a molybdenum salt solution. If desired, the molybdenum salt solution may also contain a solution of a hydrolyzable silicon compound. While many thermally decomposable molybdenum compounds may be employed, an aqueous solution of ammonium molybdate is entirely satisfactory. The alumina is slurried with the ammonium molybdate solution for about 30–60 minutes to assure thorough mixing. If it is desired to incorporate a small amount of silica with the catalyst, the ammonium molybdate impregnating solution may contain a small quantity of a hydrolyzable silicon compound such as tetraethyl orthosilicate, or a solution of this material may be added after impregnation with the molybdenum salt solution and mixing continued for a short period. Following mixing, the slurry is filtered, dried and calcined to form the finished catalyst. Alternatively, the entire slurry may be dried without filtration at a temperature of about 200°–400° F. to a T. V. of about 15–25%. The dried material is then crushed, sized and thermally activated to form the finished catalyst.

The alumina prepared in accordance with the present invention may also be impregnated after it has been dried. For example, alumina in the form of sized irregular granules, extrusions or spray-dried microspheroidal particles may be impregnated with a molybdenum salt solution, and if desired, impregnated simultaneously or subsequently with a hydrolyzable silicon compound, followed by drying and calcining. Alternatively, a slurry containing the alumina and the molybdenum salt, and a silicon compound if desired, may be spray-dried to form a composite microspheroidal catalyst. Likewise, a shaped catalyst may be prepared by incorporating catalytic materials with the alumina paste which is subsequently extruded and calcined.

The invention is illustrated by the following specific, non-limiting examples.

*Example I*

Granulated aluminum in the amount of 270 g. was amalgamated by immersion in 300 cc. of a 0.4% solution of mercuric chloride. Following amalgamation, the aluminum was repeatedly washed with water and then added to a 16 liter battery jar equipped with a powerful stirrer and containing a mixture of 1.125 liters of 30% hydrogen peroxide solution and 11.25 liters of water. The mixture was agitated for 24 hours, after which a small amount of aluminum remaining unreacted was removed, and the alumina was filtered from the reaction mixture. The filter cake was dried for 48 hours at 230° F. which resulted in an extremely hard, compact, yet porous alumina product. The product was calcined for a period of four hours at 800° F. X-ray diffraction analysis indicated that it consisted of a mixture of alpha alumina monohydrate and a gamma-type alumina. The calcined alumina had the following properties:

Surface area_____m.²/g__ 243
Pore volume_____cc./g__ 0.49
Pore diameter_____A__ 81
Particle density_____g./cc__ 1.08

*Example II*

Three aluminas were prepared by the general method set forth in Example I. In each preparation, 30 g. of amalgamated aluminum was contacted with 2500 cc. of hydrogen peroxide solution. The $H_2O_2$ concentration of each solution was as follows: (1) 1.5%, (2) 3% and (3) 11.25%. Both of the aluminas prepared from solutions (1) and (2) were exceptionally hard, while the alumina prepared with solution (3) was very soft.

*Example III*

A quantity of granular aluminum was amalgamated with 1 gram of a 3.1% mercuric chloride solution per gram of aluminum. A six-gallon crock fitted with a steel agitator was provided with 11,250 cc. of distilled water and 1422 g. of 29% $H_2O_2$ solution. To this dilute hydrogen peroxide solution there was added 150 g. of amalgamated aluminum. Agitation was initiated and continued throughout the reaction. The temperature during reaction was 70–75° C. After 3.42 hours all of the amalgamated aluminum had reacted. The alumina thus formed was a rapid settling, easy filtering material. A sample portion of freshly agitated slurry of the material was placed in a 250 cc. graduated cylinder and the rate of settling of the alumina was observed as follows:

| Setting Time (Hr.) | 0 | 0.37 | 2.67 | 3.85 | 6.4 | 27.8 |
|---|---|---|---|---|---|---|
| Clear Supernatant Solution (Percent) | 0 | 4.3 | 36 | 47 | 49.4 | 54.4 |

After about 7 hours it was possible to siphon off about 50% of the supernatant liquid. The sample was returned to the slurry, which was then charged to a filter. Filtering consumed 1.2 hours and yielded 4400 g. of a hard filter cake containing 563 g. or 12.8% by weight $Al_2O_3$.

*Example IV*

Alumina was prepared in accordance with the method set forth in Example III by adding 581.6 g. of amalgamated aluminum to 52,638 g. of a 3.26% $H_2O_2$ hydrogen peroxide solution. The reactants were agitated for a period of 2.5 hours at which time approximately 1% of the aluminum charged remained unreacted. Agitation was suspended and the reaction mixture was allowed to stand for about 5 hours after which approximately 29 liters of supernatant liquid was siphoned off. The residual material was agitated to form a smooth slurry and charged to a vacuum filter. The filter cake, containing 12% $Al_2O_3$ was divided into two parts and two catalysts, hereinafter designated Catalyst 1 and Catalyst 2, were prepared.

In the preparation of Catalyst 1, 4,380 g. of the filter cake (containing 535 g. $Al_2O_3$) was slurried with 1,308 g. of water and a molybdenum-impregnating solution consisting of 63.6 g. of $(NH_4)_6Mo_7O_{24}\cdot 4H_2O$ and 150 cc. of water. The slurry was constantly agitated in a crock for a period of 30 minutes, after which it was dried in a forced draft oven for 10.5 hours to yield 693 g. of a molybdena-alumina catalyst having a T. V. of about 17%. The hard product was crushed and sieved to 6–16 mesh, and activated by raising its temperature to 1200° F. over a period of one hour and holding at 1200° F. for two hours. The finished catalyst contained 9% $MoO_3$, and had a density of 0.77 g./cc.

Catalyst 2 was prepared by slurrying 2,253 g. of the wet filter cake (containing 270 g. $Al_2O_3$) with a solution of ammonium molybdate consisting of 32.6 g.

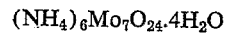

$(NH_4)_6Mo_7O_{24}\cdot 4H_2O$ and 100 cc. $H_2O$. The slurry was mixed in a Hobart mixer for 30 minutes. At this point, a hydrolyzable silicon impregnating solution comprising 3 cc. of 0.3% HCl solution, 674 cc. of 95% ethanol and 22.4 cc. of tetraethyl orthosilicate solution containing 0.27 g. $SiO_2$/cc. was added to the mixer, and mixing was continued for 13 additional minutes. The slurry was then removed from the mixer and hydrolysis of the tetraethyl orthosilicate was effected during standing for 16 hours at room temperature, followed by boiling for approximately 20 minutes. The approximate weight loss during boiling was 600 g. The resulting slurry was charged to a forced draft oven and dried at 230° F. for 22 hours. This treatment yielded 349 g. of a molybdena-alumina-silica catalyst having a T. V. of about 20%. The hard catalyst was crushed and sized to 6–16 mesh. Catalyst 2 analyzed 8.8% $MoO_3$, 2% $SiO_2$, and 89.2% $Al_2O_3$ dry basis, and had a density of 0.48 g./cc. Activation was in accordance with the method set forth in connection with Catalyst 1.

The reforming ability of Catalysts 1 and 2 was compared with a commercial hydroforming catalyst under actual hydroforming conditions. The hydroformer feedstock employed in the activity tests had the following characteristics:

| | |
|---|---|
| Aromatic plus olefin content by acid extraction _____vol. percent__ | 22 |
| Aromatic content by silica gel adsorption _____vol. percent__ | 19 |
| Bromine number _____ | 1.5 |
| Aniline point _____°F__ | 120 |
| Sulfur _____wt. percent__ | 0.22 |
| Density (25/4° C.) _____g./cc__ | 0.774 |

ASTM distillation:
| | |
|---|---|
| Overpoint _____°F__ | 163 |
| Percent Evap 10 _____°F__ | 255 |
| Percent Evap. 50 _____°F__ | 306 |
| Percent Evap. 90 _____°F__ | 396 |
| Endpoint _____°F__ | 449 |

The hydroformer feedstock was passed over a 200 cc. catalyst bed maintained at 950°±4° F. at a liquid hourly space velocity of 2.25±0.05. The pressure in the reactor was 250±3 p. s. i. g., and the hydrogen feed rate was 1900±50 ft.$^3$/bbl. of charge. Under these conditions a commercial catalyst containing 9% $MoO_3$ and 91% $Al_2O_3$, used as a Standard Catalyst, was observed to have an activity index of 100. Catalyst 1 had an activity index of 123 after the first hour, and an activity index of 131 after four hours on stream. The coke on the catalyst after four hours was 0.73% by weight.

Catalyst 2, containing 2% $SiO_2$, had an activity index after one hour of 97 and after four hours on stream of 104. After four hours the coke on Catalyst 2 was 0.58% by weight.

I claim:

1. A method of preparing a hard, porous alumina which comprises contacting amalgamated aluminum with 25–100 times its weight of an aqueous hydrogen peroxide solution containing about 1–4% by weight $H_2O_2$, maintaining the reaction mixture between about 70° and 90° C., separating the resulting alumina from the aqueous reaction mixture and drying the same.

2. A method of preparing a hard, porous alumina which comprises contacting amalgamated aluminum at a temperature above about 70° C. and below the boiling point of the solution with an aqueous hydrogen peroxide solution containing about 1–4% by weight $H_2O_2$ in a weight ratio of aluminum to hydrogen peroxide solution between 1:25 and 1:100, whereby said amalgamated aluminum is converted into rapidly settling alumina, separating said alumina from the aqueous reaction mixture and drying the same.

3. A method of preparing a supported molybdena hydroforming catalyst which comprises forming an alumina base by contacting amalgamated aluminum at 70–100° C. with an aqueous solution containing about 1–4% by weight $H_2O_2$ in a weight ratio of aluminum to hydrogen peroxide between 1:25 and 1:100; whereby said aluminumer is converted to alumina, separating said alumina from the reaction mixture, slurrying the undried alumina with water and a solution of a thermally decomposable molybdenum compound, separating the thus treated alumina, drying, and thermally activating to form a catalyst.

4. A method of preparing a supported molybdena hydroforming catalyst which comprises forming an alumina base by contacting amalgamated aluminum at 70–100° C. with 25–100 times its weight of an aqueous solution containing about 1–4% by weight $H_2O_2$, whereby said aluminum is converted to alumina, separating said alumina from the reaction mixture, slurrying the alumina with an aqueous solution containing a thermally decomposable molybdenum compound and a hydrolyzable silica compound, hydrolyzing said silica compound, separating the thus treated alumina from the aqueous solution, drying and thermally activitating to form a catalyst.

5. A method of preparing a supported molybdena hydroforming catalyst which comprises forming an alumina base by contacting amalgamated aluminum at 70–100° C. with an aqueous solution containing about 1–4% by weight $H_2O_2$ in a weight ratio of aluminum to hydrogen peroxide between 1:25 and 1:100, whereby said aluminum is converted to alumina, separating said alumina from the reaction mixture, slurrying the undried alumina with an aqueous solution containing ammonium molybdate and tetraethyl orthosilicate in amounts sufficient to yield a product consisting essentially of alumina base supporting up to about 15% by weight of molybdena and up to about 3% by weight of silica, hydrolyzing said orthosilicate, separating the thus treated alumina from the aqueous solution, drying and thermally activating to form a catalyst.

6. A method of preparing a molybdena-alumina-silica hydroforming catalyst which comprises forming an alumina base by contacting amalgamated aluminum with 26–100 times its weight of an aqueous solution containing about 1–4% by weight $H_2O_2$, in a weight ratio of aluminum to hydrogen peroxide between 1:25 and 1:100, maintaining the reaction mixture between about 70° C. and its boiling point, whereby said aluminum is converted to alumina, separating said alumina from the reaction mixture, incorporating with the undried alumina an aqueous solution of ammonium molybdate and a solution of tetraethyl orthosilicate, heating the mixture to hydrolyze said orthosilicate, separating the thus treated alumina, and drying and activating the same.

7. The method of claim 2 wherein the weight ratio of aluminum to hydrogen peroxide solution is between 1:60 and 1:80.

8. The method of claim 2 wherein the reaction mixture of aluminum and peroxide solution is maintained at a temperature of 80–90° C.

9. The invention of claim 2 wherein the concentration of $H_2O_2$ in the aqueous reactant is about 3%.

References Cited in the file of this patent

UNITED STATES PATENTS

| | | |
|---|---|---|
| Re 22,196 | Heard _____ | Oct. 6, 1942 |
| 2,449,847 | Heard _____ | Sept. 21, 1948 |
| 2,638,454 | Rowan _____ | May 12, 1953 |

OTHER REFERENCES

Mellor's "Comprehensive Treatise on Inorganic and Theoretical Chemistry," vol. 5, New York (1924), pp. 204–205–206.